July 17, 1956

A. MERUNOVICH 2,755,398

UNIPOLAR GENERATOR

Filed Sept. 19, 1952

INVENTOR
ANDREW MERUNOVICH.

BY Oberlin & Limbach

ATTORNEYS.

United States Patent Office 2,755,398
Patented July 17, 1956

2,755,398
UNIPOLAR GENERATOR

Andrew Merunovich, Wangaratta, Victoria, Australia

Application September 19, 1952, Serial No. 310,488

3 Claims. (Cl. 310—178)

This invention relates to a unipolar generator of the type having a permanent magnet stator and a metallic rotor of relatively thin disc or cylindrical form.

The principal disadvantage of generators of the type referred to is the reduced efficiency arising from friction and rapid wear associated with the brushes. Furthermore, previous constructions have necessitated the employment of relatively heavy metallic rotors causing excessive losses due to the generation of eddy currents which has been accentuated by the relatively small numbers of current collecting brushes.

The principal objective of the present invention is to provide a unipolar generator of simple economical construction in which the above disadvantages are avoided and a greater current generating efficiency is capable of being achieved.

According to this invention a unipolar generator is provided with a metallic disc rotating within the field of the permanent magnet and a channel member containing mercury located about the outer periphery of the disc, said mercury during rotation of the disc forms a continuous contact with the peripheral edge of the disc for collecting current induced therein.

Reference will now be made to the accompanying drawings illustrating practical embodiments of unipolar generators constructed in accordance with the present invention. In these drawings.

Figure 1:
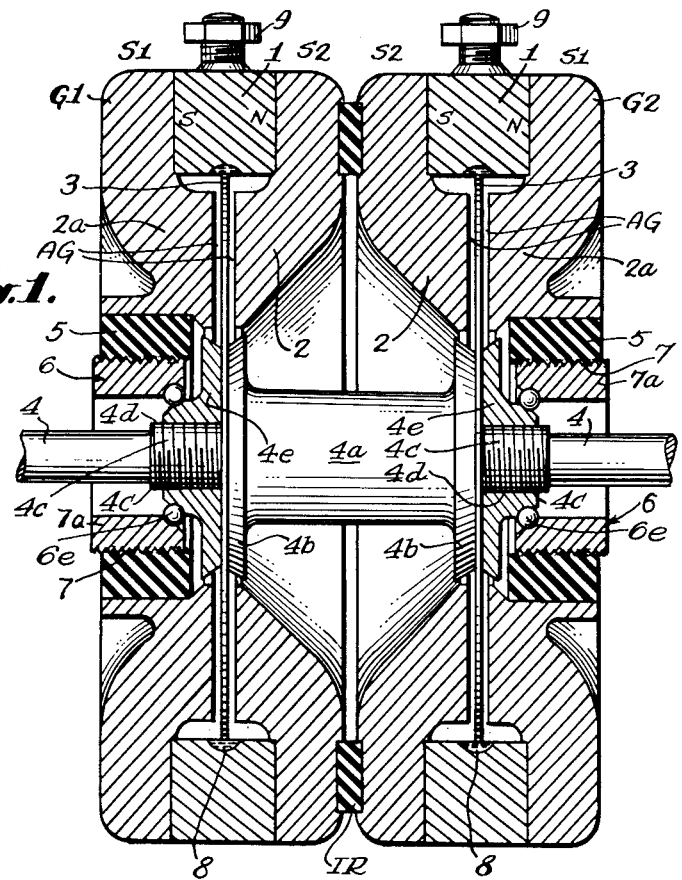
Fig. 1 is a view in vertical section of a pair of unipolar generators constructed in accordance with the invention wherein the rotors are mounted on a common shaft and rotating within the fields of separate permanent magnets forming the stators of the generators.

In the embodiment illustrated in Fig. 1 the generator comprises two generators G1 and G2, each having stators S1 and S2 consisting of ring magnets 1, 1 which have been magnetized axially, and are provided with pole shoes 2 and 2a in the form of rings adapted to direct the magnetic fields within the ring magnets 1, 1 and provide narrow air gaps AG positioned along transverse axes of the ring magnets.

The stators S1 and S2 are axially aligned and spaced apart by insulating ring IR arranged between pole shoes 2, 2. The pole shoes 2a are formed to receive insulating sleeves 5 adapted to support bearings 6 for a shaft 4 supporting two armature discs 3 made of high quality steel, e. g. nickel or silica-manganese steel, 1/32 to 1/16 of an inch in thickness. The armatures 3 rotate in the airgap AG which is arranged to provide a minimum clearance between the armatures 3 and the pole shoes 2 and 2a. The peripheries of the armatures register with polished channels 8 formed in the inner peripheries of the ring magnets 1.

Mercury is positioned in the channel 8 and sufficient mercury is provided with each stator so that when the armatures 3 are rotating, by reason of liquid friction and centrifugal action, assisted if necessary by teeth in the periphery of the armatures, the mercury fills the entire channel and forms a continuous electrical contact between the periphery of the armatures and the stator to thereby avoid the generation of eddy currents in the armatures.

The shaft 4 comprises a central portion 4a having flanged ends 4b and extensions 4c threaded at 4d to receive flanged collars 4e. The armatures 3 are clamped into operative position by screwing the collars 4e on to the threaded parts 4d of the shaft extensions 4c to grip the armatures between the flanges 4b and the flanges of collars 4e.

The collars 4e are provided with races in which ball bearings 6e run and a complementary race for the ball bearings is formed in the ends of sleeves 7a threaded as at 7 to engage the insulating sleeves 5 carried in the pole pieces 2a.

The threaded sleeves 7a permit accurate axial adjustment of the shaft 4 to centre the armatures in the air gaps AG to avoid any distortion of the armatures by the magnetic field.

The ring magnets 1, 1 are provided with terminals 9, 9 and where the polarity of the ring magnets are arranged in the opposed manner shown in Fig. 1 and the armatures 3, 3 connected in series through the shaft 4 the current in one armature 3, will flow from centre to periphery and in the other armature will flow from periphery to centre so that the two terminals 9, 9 constitute the output terminals of the two generators G1 and G2.

It will be apparent that a single generator as G1 will require two pole pieces as 2a to support second bearing as 6, with the armature located between two flanged collars 4e. In this case the shaft 4 is the second terminal of the generator and the current may be collected therefrom by a slip ring or a brush contacting the centre of the shaft 4.

Figure 2:
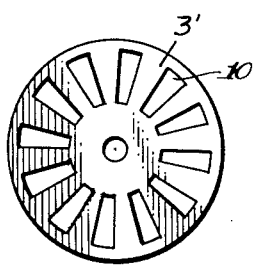
Fig. 2 is a plan view of a recessed rotor adapted to be used in a generator for generating pulsating currents.

The generator above described generates direct current of relatively high amperage at low voltage. When the armature 3' is provided with radial apertures 10 as shown in Fig. 2 and the pole shoes with corresponding and complementary pole surfaces (not shown) then the generator will produce pulsating current of high frequency or ultra-sound frequency according to the number of apertures 10 and the speed of rotation of the armature.

Figure 3:
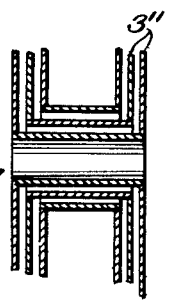
Fig. 3 is a diagrammatic sectional view of a composite rotor embodying three pairs of rotor discs each mounted on a common shaft and arranged to operate in two groups in the fields of two permanent magnets.

To produce current at higher voltage two, three or more pairs of armatures 3" are arranged as diagrammatically illustrated in Fig. 3. The pairs of armatures are insulated from each other with the peripheries of each adjacent armature spaced as shown. In this embodiment the peripheries of the armatures rotate in separate channels insulated from each other and carrying mercury as previously described. The channels are also insulated from the stator and the channels of pairs of rotors may be connected in series, or parallel or series-parallel as may be required. Where the channels are insulated from the stator and each other it is not necessary to insulate the permanent magnets from each other.

In order to obtain still higher voltages it is more practical to connect several generators in series as it has been found that a generator of large size has a relatively smaller power output per unit of weight.

An armature of 4 inches diameter which has been accurately balanced at less than 0.01 grams at the circumference, can in practice achieve a speed of 60,000 R. P. M., which permits generators as above described to be direct coupled to high speed steam or gas turbines.

The generator may also be arranged with a vertical shaft.

It will also be apparent that the apparatus can be used as an electric motor.

I claim:

1. A unipolar generator of the type having a permanent magnet and a relatively thin metallic rotor, comprising a permanent magnet of annular formation and annular pole shoes to constitute the stator, a steel disc forming the rotor and mounted on a shaft for rotation within the inner periphery of the magnet and between the pole faces of the pole shoes so as to direct the magnetic field through a major portion of the disc from the sides thereof, a groove formed in the inner periphery of the magnet and within which the outer edge of the disc registers to rotate therein, serrations formed in the periphery of the disc, mercury in said groove adapted during rotation of the disc to form a continuous contact with the peripheral edge of the disc for collecting current induced therein, flanged nuts screwed on the shaft and between which the disc is clamped and located between the pole shoes and in register with the groove in the magnet, an insulating sleeve carried in each pole shoe, and an axially adjustable ball race secured in said sleeve arranged to permit axial adjusting movement of the shaft for accurate location of the disc between said pole shoes.

2. A unipolar generator of the type having a permanent magnet and a relatively thin metallic rotor, comprising a pair of spaced permanent magnets of annular formation and annular pole shoes constituting stators axially aligned and insulated from each other, spaced steel discs mounted on a common shaft and each arranged to rotate within the inner periphery of one of the permanent magnets and between the pole faces of the associated pole shoes so as to direct the magnetic field through a major portion of each of the discs from the sides thereof, a groove formed in the inner periphery of each magnet and within which the outer edge of a disc registers to rotate therein, serrations formed in the periphery of the discs, mercury in said grooves adapted during rotation of the discs to form a continuous contact with the peripheral edges of the discs for collecting currents induced therein, spaced flanges on said shaft to form seating abutments for the discs, flanged nuts screwed on the shaft to clamp the discs against their abutments and thereby locate the discs between their associated pole shoes and in register with the groove in the magnet, an insulating sleeve carried in each outer pole shoe, and an axially adjustable ball race secured in each said sleeve arranged to permit axial adjusting movement of the shaft for accurate location of the discs between their respective pole shoes.

3. A unipolar generator as claimed in claim 2 and wherein the spaced steel discs are provided with radial openings and the pole shoes have complemental grooves whereby the generator produces a pulsating current.

References Cited in the file of this patent

UNITED STATES PATENTS

| | | |
|---|---|---|
| 338,169 | Forbes | Mar. 16, 1886 |
| 342,504 | Eickemeyer | May 25, 1886 |
| 523,998 | Rennerfelt | Aug. 7, 1894 |
| 742,600 | Cox | Oct. 27, 1903 |
| 1,987,479 | Japolsky | Jan. 8, 1935 |